INVENTORS:
OTTO J. ADLHART
CARL D. KEITH
PHILIP R. ROMEO, SR.

BY

ATTORNEY

United States Patent Office 3,489,809
Patented Jan. 13, 1970

3,489,809
SELECTIVE HYDROGENATION WITH A CATALYST ON A HONEYCOMB SUPPORT
Carl D. Keith, Countryside, Philip L. Romeo, Sr., Englishtown, and Otto J. Adlhart, Newark, N.J., assignors to Engelhard Minerals & Chemicals Corporation, Newark, N.J., a corporation of Delaware
Filed Apr. 17, 1968, Ser. No. 722,109
Int. Cl. C07c 7/02
U.S. Cl. 260—677                                13 Claims

ABSTRACT OF THE DISCLOSURE

An improvement in selective organic reactions results from use of unitary ceramic block catalyst supports with active sites, particularly sites containing Group VIII metal catalysts. With such supported catalysts purifications are carried out at higher linear velocities than common with conventional packed small particle catalyst beds. Improved selectivity is obtained in reactions in which the impurity is more strongly adsorbed than the product. One example of the purifications involved concerns selective hydrogenation in olefinic gas streams of acetylenes and diolefins.

BACKGROUND OF THE INVENTION

This invention relates to the purification of gaseous unsaturated hydrocarbon streams by selective hydrogenation of more unsaturated hydrocarbons present therein as impurities. For example it concerns the removal of acetylenes and diolefins from olefin streams and acetylenes from diolefins.

Olefins are produced by various processes, the major ones of which are petroleum-cracking and methane cracking, which usually yield raw olefins contaminated with acetylenes and diolefins in concentrations ranging up to about 3%. These impurities interfere with further processing and typically have to be removed to levels below 0.2% and preferably below 10 p.p.m.

One known method for removal of these impurities is by selective hydrogenation using platinum group metal catalysts. Catalyst selectivity may be defined in this instance as the ability of a catalyst to promote hydrogenation of the impurity rather than the hydrogenation of the desired olefin to the corresponding alkane. In the case of acetylenic contamination of ethlyene streams, therefore, selectivity pertains to the ability of the catalyst to promote the reaction (1) to a greater extent than reaction (2):

(1)       $C_2H_2 + H_2 \rightarrow C_2H_4$
(2)       $C_2H_4 + H_2 \rightarrow C_2H_6$ Palladium is generally recognized as a superior catalytic metal for selective purification of olefin and diolefin streams because of its high selectivity and activity. Supported palladium has been found particularly suitable and the palladium has been used on particulate carriers such as pellets. The palladium concentrations in these particulate catalysts are very low, frequently 0.01–0.001% Pd based on the weight of the catalyst metal plus support. This is necessary to obtain the desired selectivity. Whereas these particulate catalysts function well at low impurity levels, with higher concentrations, especially with acetylene concentrations of about 1% and higher, they are not satisfactory. Because of the very low catalytic metal concentration, they are readily poisoned and have short life. They are deactivated particularly by polymers produced in side reactions and require frequent regeneration thereby causing unwanted difficulty and increased expense during ethylene purification. Additionally, the design of equipment used in conjunction with conventional particulate catalysts is limited to relatively large diameter reactors in order to avoid high pressure drop in the apparatus. This problem increases with increasing space velocity.

Inasmuch as present commercial high temperature naphtha cracking processes produce ethylene streams having typically 1.75% to 2.50% acetylene and because most of the newer cracking operations provided ethylene with high acetylene concentrations, it has become increasingly important to obtain catalysts which can adequately cope with the new demands for ethylene purification.

SUMMARY OF INVENTION

According to the present invention, it has been discovered that unitary ceramic honeycomb type supports for Group VIII metal catalysts provide a structure uniquely qualified to greatly increase the efficiency of processes for removing acetylenic and diolefinic contaminants from normally gaseous olefins, and for removing acetylenes from diolefins. Palladium when deposited on such honeycomb type supports is substantially superior to palladium catalysts heretofore known. And good selectivity is obtained with these honeycomb type catalysts even at high precious metals concentrations. The improved catalyst structures provide greater overall removal of contaminants at less cost with smaller equipment, greater throughput and improved selectivity. The catalyst support is made up of a honeycomb type skeletal structure having gas-flow paths therethrough which permit operation of the purification processes at high linear velocity, at high space velocity, and with high selectivity. Moreover the process is effected with long catalyst life, and problems of back pressure as well as catalyst regeneration are minimized.

The process of this invention is particularly effective for reducing the amount of acetylene in ethylene streams from about 1–3% by volume and higher to about 0.2% and less.

The unitary ceramic honeycomb type catalyst may be used in single stage or multi-stage processes which may incorporate both honeycomb type and particulate catalysts. In a preferred embodiment for achieving an overall selective removal of acetylene from ethylene streams containing 1–3% by volume acetylene to less than 10 p.p.m., a multi-stage process is used in which the unitary ceramic honeycomb type catalyst containing 0.01–10% Pd is used at a volume hourly space velocity of 50,000 to 4,000,000 in one or more stages to remove the acetylene to a level of less than about 0.5% and in a final stage a particulate catalyst containing 0.5–0.001% Pd is used at a volume hourly space velocity of 3,000 to 50,000 to remove the acetylene concentration to less than 10 p.p.m. In the preferred multi-stage process, a high degree of purity can be achieved in ethylene streams containing high levels of acetylene contamination with overall advantages over prior art processes with respect to process conditions, reactor design, catalyst life, and efficiency.

BRIEF DESCRIPTION OF THE DRAWINGS

Referring to the accompanying drawings.

Referring to FIGURE 1, the catalyst 1, shown in cross section, is comprised of an inert unitary ceramic honeycomb type skeletal support with accessible macropores at the surface, e.g. the ceramic may be zircon mullite, a refractory oxide such as alumina deposited on the support, and a platinum group metal, e.g. Pd, deposited on the refractory oxide deposit and skeletal support. As shown in FIGURE 1, a plurality of superposed corrugated layers 2 alternate with and are adhered to a plurality of horizontally shown layers 3 and together therewith define unobstructed gas flow paths 4.

The gaseous mixture passes into and through gas flow paths 4, extending generally in the direction of gas flow through a supported catalyst wherein the gaseous mixture contacts the platinum group metal catalyst on the surfaces of the paths and of accessible macropores communicating with paths. The surfaces of the paths and macropores of supported catalyst have thereon the activated refractory metal oxide with the platinum group metal on the refractory metal oxide. Some of the platinum group metal may be deposited directly on the ceramic skeletal support of the catalyst.

Figure 2:
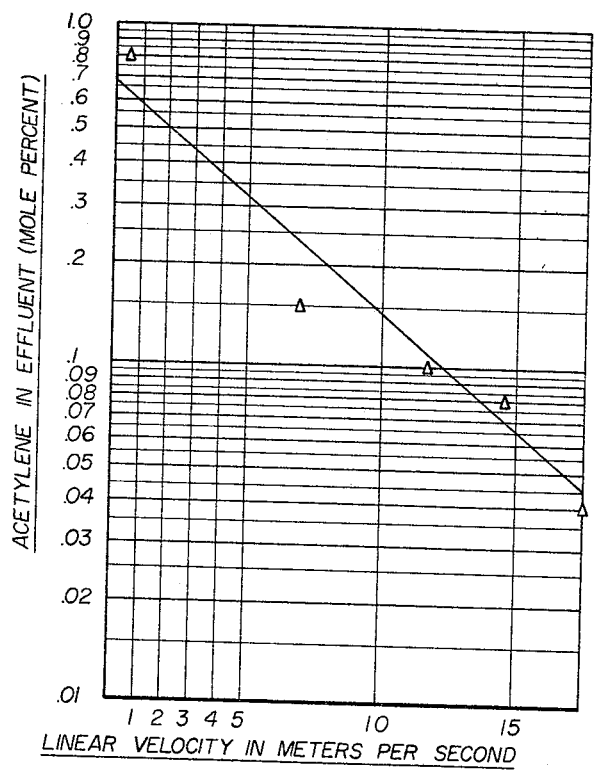
FIGURE 2 is a semi-logarithmic plot showing acetylene removal as a function of linear velocity, with space velocity constant at 600,000 hr.$^{-1}$, in a process using a unitary ceramic honeycomb type catalyst.
Figure 3:
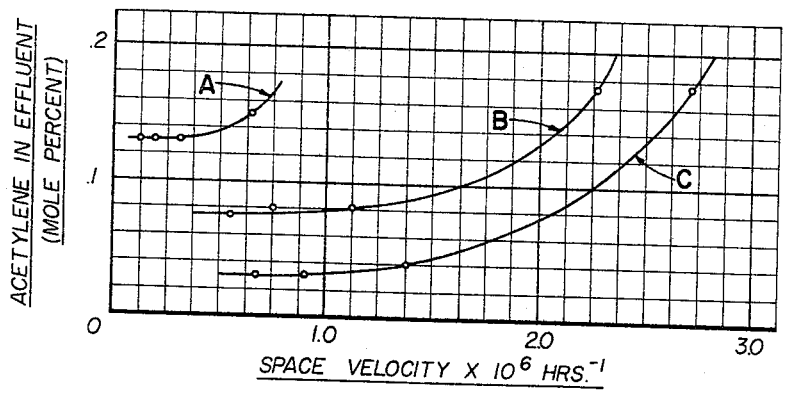
FIGURE 3 is a plot of three curves which show the acetylene removal as a function of space velocity, with linear velocity constant, in a process using a unitary ceramic honeycomb type catalyst.
Figure 1:
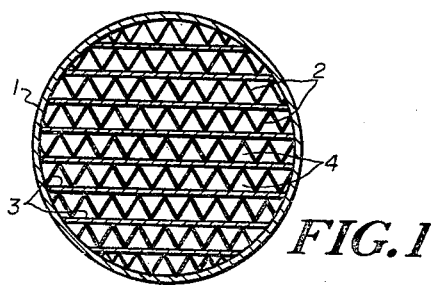
FIGURE 1 is a cross-sectional view of a reactor "packed" with a unitary ceramic honeycomb type catalyst according to this invention.

FIGURES 2 and 3 will be discussed in detail in the examples below.

DESCRIPTION OF PREFERRED EMBODIMENTS

According to this invention, olefins contaminated with diolefins and/or acetylenes and diolefins having acetylenic impurities are purified by treatment of the crude gas stream with hydrogen in the presence of palladium catalysts on a particularly effective catalyst support. The process of this invention is effected at particularly favorable flow conditions.

Examples of acetylenes and diolefins which may be present in olefin streams are acetylene in ethylene, methyl acetylene and allene in propylene, vinyl acetylene in butadiene, butadiene in butylene, and other streams which are obtained by pyrolysis of saturated hydrocarbons and during refining operations generally. The selective reactions discussed above are those in which the impurity is more strongly adsorbed by the honeycomb type catalyst than the gas being purified. Relatively unsaturated compounds tend to be adsorbed more readily than more saturated compounds. It is therefore believed that the present method may be used generally for selective purifications involving reaction of an impurity more unsaturated than the gas to be purified. As illustrative of the invention, the purification process will be hereinafter described by reference to the removal of the impurity acetylene from an ethylene stream. It should be understood, however, that it is not intended that the present invention be limited as a result of this simplification for the purpose of clarity.

As indicated above, typical process streams may contain up to 3% acetylenes and higher, and this process is particularly effective at higher acetylene concentrations, i.e. 1% and higher.

The process is run in the presence of a Group VIII metal preferably palladium or in the presence of such a metal as palladium promoted for improved selectivity with a metal such as rhodium, ruthenium, gold, silver, copper or iron. This promoter metal may be present to the extent of from about 0.001%–5% by weight of the palladium utilized. The selectivity of the catalyst may also be improved by treatment with sulfur, e.g. with $H_2S$, or by treatment with carbon monoxide. The platinum group metal, for example palladium, may be deposited on the support so that the support catalyst may contain about 0.01%–10% palladium and preferably 0.05–2% palladium based on the total weight of the catalyst plus support. The palladium is deposited on the honeycomb type unitary ceramic support which may or may not have a refractory oxide coating thereon, or the palladium is first deposited on an activated carrier such as alumina or silica and then the carrier with the palladium deposited thereon is deposited on the honeycomb type unitary ceramic support.

Application of the catalytic metal to the unitary ceramic honeycomb type support can be effected in several ways for example by immersing the skeletal structure with or without the refractory metal oxide deposited thereon, in an aqueous solution of a water-soluble inorganic salt or salts of the particular metal or metals, followed by agitating the metal or metals in the oxide or other chemically combined state, for instance the oxide state, on the skeletal structure. The metal oxide can then be reduced, when the metal form catalyst is desired, by contacting same with a reducing gas, e.g. $H_2$, at an elevated temperature of between 100° C. and 1,100° C.

The unitary ceramic honeycomb type support, as used herein, refers to a porous unitary inert refractory skeletal structure which is characterized by having a large plurality of gas flow paths extending therethrough in the direction of gas flow. The paths may be substantially parallel and extend through the support from one side to the opposite side, such openings being separated from one another by preferably thin walls defining openings. Alternatively, a network of paths may permeate the body so as to form a tortuous flow path through the ceramic. The path openings are distributed across the entire face or cross-section of the support and are subject to initial contact with the gas to be reacted. The paths can be of any shape and size consistent with the desired superficial surface area and should be large enough to permit free passage of the crude olefin gas mixture and hydrogen therethrough. The cross-sectional shape of the paths can be, for example, a trapezoid, rectangle, square, sinusoid, or circle, and cross sections of the support show a repeating pattern that can be described as a honeycomb, corrugated or lattice structure. In order to simplify the description of the catalyst support, it will be and has been referred to as a unitary ceramic honeycomb type support, but it will be clear that it is not intended that the shape of the cross-sectional area of the support be construed as being limited as a result.

The supported catalyst is preferably disposed in the reactor in such fashion that its structure occupies approximately all of the cross-sectional area of the reaction zone. Advantageously the unitary ceramic honeycomb type support is shaped at its outer edges to fit the reaction zone into which it is to be disposed, and the honeycomb type catalyst is positioned in the reactor with the paths extending generally in the direction of gas flow.

The unitary ceramic honeycomb type support is constructed of a substantially chemically and catalytically inert, porous, rigid, solid refractory material capable of maintaining its shape and strength at high temperatures, for instance up to about 1,100° C. or more. It preferably has a low thermal coefficient of expansion which is less than $6 \times 10^{-6}$ per ° C. between 30° C. and 700° C., this being of importance for good shock resistance. The refractory material has a bulk density of about 0.4–2.0 grams per cubic centimeter, preferably about 0.5–1.2 grams per cubic centimeter and is essentially crystalline in form and advantageously at least about 90% crystalline material marked by the absence of any significant amount of glassy or amorphous matrices, for instances of the type found in porcelain materials. Further, the skeletal structure has considerable accessible porosity as distinguished from the substantially non-porous porcelain utilized for electrical applications, for instance spark plug manufacture, characterized by having relatively little accessible porosity. The accessible pore volume not including the volume of the gas flow channels or paths is generally in excess of about 0.01 cc./g. of skeletal structure, preferably between about 0.03 and 0.3 cc./g.

The walls of the paths of such honeycomb type support structures used according to this invention contain a multiplicity of surface macropores in communication with the paths to provide a considerably increased accessible catalyst surface, and a substantial absence of small pores for high temperature stability and strength. Whereas the superficial surface area of such structures may be of the order of about 0.001 to 0.01 m.²/g. including the channels, the total surface area is typically many times greater, so that much of the catalytic reaction may take place in the large pores. Typically the total accessible surface area of the support is between about 0.01 and 2.0 m.²/g. The skeletal structure has a macropore distribution such that over 95% of the pore volume is in pores having a diameter greater than about 200 angstrom units.

The geometric superficial or apparent surface area of the carrier including the walls of the gas flow paths will often be about 0.5 to 12, preferably 1 to 5, square meters per liter of support.

The preferred unitary ceramic honeycomb type supports of this invention are composed of zircon-mullite, mullite, mullite-silica, alpha-alumina, alumina-silica-magnesia and zirconium silicate. Examples of other refractory crystalline ceramic materials utilizable in place of the preferred materials as support or carrier are sillimanite, magnesium silicates, zircon, petalite, spodumene, cordierite, and alumina-silicates.

A refractory metal oxide may be deposited on the porous honeycomb type support. This material is a calcined refractory metal oxide which itself is characterized by a porous structure and which possesses a large internal pore volume and total surface area. Generally, the total surface area of the refractory metal oxide is at least about 10 square meters/gram, preferably at least about 100 square meters/gram. Such oxides can be prepared by dehydrating preferably substantially completely the hydrate form of the oxide by calcination usually at temperatures of about 150° C. to 800° C. The preferred active metal oxides contain members of the gamma or activated alumina family which can be prepared, for instance, by precipitating a hydrous alumina gel and thereafter drying and calcining to expel hydrated water and provide the active gamma-alumina. A particularly preferred active refractory metal oxide is obtained by drying and calcining at temperature of about 300° C. to 800° C. a mixture of precursor hydrous alumina phases predominating in crystalline trihydrate, that is, containing in excess of about 50% of the total alumina hydrate composition, preferably about 65%–95%, of one or more of the trihydrate forms gibbsite, bayerite and nordstrandite by X-ray diffraction. The substantial balance of the hydrate, preferably about 35% to 5%, may be amorphous, hydrous or monohydrous boehmite alumina. Calcination of the precursor hydrous alumina is preferably controlled so that the gamma-alumina obtained contains monohydrate alumina in an amount substantially equivalent to that originally present in the mixture of the high trihydrate precursor hydrous alumina phases. Other suitable refractory metal oxides include for example active or calcined beryllia, zirconia, magnesia, silica, etc., and combinations of metal oxides such as boria-alumina, silica-alumina, magnesia-alumina, etc. Preferably the activated refractory oxide is composed predominantly of oxides of one or more metals of Groups II, III and IV having atomic numbers not exceeding 40.

Depositing the active refractory metal oxide on the support may be accomplished in several ways. One method involves dipping the support into a solution of the salt of the refractory metal and calcining to decompose the salt to the oxide form. A more preferred method comprises dipping the support into an aqueous suspension, dispersion or slurry of the refractory oxide itself, drying and calcining. In this method, suspensions or dispersions having a solids content in range of about 10% to 70% by weight can be used to deposit a suitable amount of an active refractory metal oxide on the support in a single application. In order to prepare a catalyst having 10% activated alumina on a zircon-mullite structure, about 20%–40% solids in the suspension is used. The percent solids is determined on an ignited weight basis (ignited at 1,100° C.). In general calcining temperatures within the range of about 150° C. to 800° C. are employed. The calcination is favorably conducted in air, for example flowing dried air, or may be carried out in contact with other gases such as oxygen, nitrogen, hydrogen, flue gas, etc., or under vacuum conditions. The refractory oxide is deposited on the surfaces of the skeletal structure including the path surfaces and the surfaces of the superficial macropores in communication with the path surfaces as thin deposits in an amount, by weight, of about 1% to 50% and preferably 5% to 30% based on the weight of the skeletal structure.

The gas flow channels of the honeycomb type supported catalyst herein are thin-walled paths providing a large amount of superficial surface area. The walls of the cellular paths are generally of the minimum thickness necessary to provide a strong unitary body. This wall thickness will usually fall in the range of about 2 to 10 mils. With this wall thickness the structures contain from about 25–2500 or more gas or flow path inlet openings per square inch and a corresponding number of the gas flow paths, preferably about 100–2,000 gas inlet and flow paths per square inch. The open area should be in excess of 60% of the total area. The size and dimensions of the honeycomb type support of this invention can be varied widely as desired.

The honeycomb type supports providing the multiplicity of gas flow paths can be prepared from any of the refractory ceramic materials previously mentioned herein. One method of preparing such supports is by applying by spraying, dipping or brushing a suspension of the pulverized ceramic material and an organic binder, for instance gum arabic, colophony, acrylate resins, methacrylate resins, alkyl resins, phenolic resins or a chlorinated paraffin, to each side of a plurality of flexible organic carrier sheets, for instance of cellulose, acetate paper, onion skin paper, nylon cloth or polyethylene film. Several of the thus-coated carrier sheets are then corrugated by, for instance crimping or multi-folding the sheets, and the remaining coated carrier sheets are left in their original flat condition. The coated corrugated and flat sheets are then superposed one on another in alternate corrugated and flat sheet relationship. The resultant multi-layer structure is then fired in a furnace at a slow rate to prevent breakage due to thermal shock and to a temperature sufficiently high to sinter the ceramic particles into a unitary structure. During the firing the organic binders are removed by decomposition and volatilization. Such preparation method is disclosed in British Patent 882,484. The porous inert unitary solid refractory skeletal structure support having the plurality of gas flow paths is also obtained in commerce from the Minnesota Mining and Manufacturing Company who supplies the supports with about 4½, 7 and 11 "corrugations" per linear inch.

The processes of the present invention are performed at a temperature of from about 0° C. to about 300° C. and preferably at from about 100° C. to about 200° C. Acceptable pressures for the present invention range from about 5 p.s.i.a. to about 750 p.s.i.a. and are preferably from about 150–450 p.s.i.a.

As earlier indicated, it is an important aspect of this invention that high space velocities can be used. The optimum space velocity will depend on the number of stages in the process and the concentration of impurity. For example, to remove relatively high concentrations of acetylene from ethylene and to achieve a purity in the range of about 0.2–0.3% acetylene in the effluent, the preferred volume hourly space velocity is about 50,000–1,000,000. For lower concentrations of acetylene in the initial gas, space velocities of over 1,000,000 may be used. Volume hourly space velocities of about 4,000,000 have been used to remove over 50% by volume of the available acetylene from an ethylene stream containing 1.73% acetylene. (All gas concentrations are given herein as percent by volume.) In calculating space velocity, the gas volume is referred to standard temperature and pressure.

As an additional highly important and critical aspect of the present invention, the linear velocity of the ethylene gas through the unitary ceramic honeycomb type catalyst must reside within particular values in order to provide greatest improvement over the prior art pelletized catalyst. This is important in order to obtain highly selectivity, high throughput and longer catalyst life. It has been found that linear velocities of from about 0.5 to about 50 meters/sec. for actual flow conditions provide the results obtained by this invention. Actual linear velocities of 5–30 meters/sec. are particularly preferred.

Although we do not wish to be bound by theoretical considerations, it is believed that the advantages brought about by the present invention which combine unique catalyst structure with specified flow conditions are attributable to the combination of geometry of the supports and the gas residence time over the length of the catalyst bed. The residence time on an individual catalyst site is low and this may be a major factor in obtaining the selectivity indicated. Under these conditions acetylene is rapidly brought to the active catalyst site where it is preferentially adsorbed, hydrogenated, and replaced by new acetylene. Short and uniform residence times are therefore believed to be factors in the success of the present inventive process. These conditions are difficult to provide in a particulate catalyst bed. Use of pelletized catalysts creates areas of faster and slower flow because of the voids and narrow space openings between pellets inherent in such catalyst beds. A generally high linear flow velocity is not possible with such pelleted catalysts. This nonuniform flow rate prevents good control over process conditions and permits increased ethylene hydrogenation and decreased selectivity.

The total amount of hydrogen to be used in connection with the process of this invention should be at least that amount necessary to react with all the contaminants, i.e., a stoichiometric quantity. When multi-stage hydrogenation is used, the amounts of hydrogen used may be adjusted according to the acceptable acetylene concentration in the product gas for each stage. When little hydrogen is available for reaction, the ability of the system and process to purify the olefin will be accordingly diminished. In a single stage process, it is therefore desired that hydrogen be present at least to the extent of 20% in excess of that stoichiometrically required to complete the purification. An excess less than about 200% is desired and 40%–100% excess is preferred. If not initially present, hydrogen may be added to the olefin stream before passage through the reactor.

In one multi-stage embodiment of this invention the unitary ceramic honeycomb type catalysts may be used in two or more separate stages in obtaining normally gaseous olefins of acceptable purity. In another multi-stage embodiment for obtaining exceptionally pure ethylene, the unitary ceramic honeycomb type supported catalyst is used in the initial stage or stages to remove the acetylene to a level of less than 1% followed by a final stage using pelleted catalyst to further remove acetylene to very low levels. In a preferred multi-stage embodiment, the unitary ceramic honeycomb type catalyst is used to remove the impurities to less than ~0.5% and in a final stage the pelleted catalyst is used to remove the acetylene concentration to a level below 10 p.p.m.

The following examples are provided for the purpose of illustration and not by way of limitation.

Example 1

A single stage reactor in four 15 cm. sections of a honeycomb type catalyst was used in a series of experiments. The high space velocities employed require the use of small catalyst volumes and therefore only one or two openings of the catalyst sections were used. However, in a study using catalyst sections with up to 20 holes, it was determined that the results obtained with a single opening were representative for larger cross sections.

The catalyst used in this series of tests was about 0.5 weight percent Pd and 8 weight percent alumina deposited on a corrugated unitary ceramic skeletal support having 11 corrugations/inch. The skeletal support was an alumina-zirconia-silicate ceramic sold by a Minnesota Mining and Manufacturing subsidiary, American Lava Corporation, under the trade name Alsimag.

In the experiments, an ethylene stream containing 1.56% acetylene and 2.9% hydrogen ($C_2H_2:H_2=1:1.86$) was fed under a pressure of 200–250 p.s.i.g. to the reactor containing the catalyst sections. The temperature in the reactor bed was maintained at about 180° C. The effluent from the reactor was analyzed for acetylene content by IR or titration, and for hydrogen level by chromatography using a Linde molecular sieve column.

The results which are tabulated in Table I and plotted in FIGURE 3, show improved activity and selectivity as a function of increased space velocity and linear velocity.

TABLE I

| Space velocity (hrs.⁻¹) | Actual linear velocity (m./sec.) | Effluent composition | |
|---|---|---|---|
| | | $C_2H_2$ (vol. percent) | $H_2$ (vol. percent) |
| 640,000 | ~5.5 | 0.15 | 0.02 |
| 303,000 | | 0.13 | 0.00 |
| 191,000 | | 0.13 | 0.00 |
| 140,000 | | 0.13 | 0.00 |
| 2,260,000 | ~14.9 | .175 | 0.2 |
| 1,120,000 | | .08 | Traces |
| 750,000 | | .08 | |
| 554,000 | | .075 | |
| 2,730,000 | ~18.0 | .175 | 0.29 |
| 1,360,000 | | .04 | 0.03 |
| 900,000 | | .03 | 0.01 |
| 675,000 | | .03 | 0.00 |

In FIGURE 3, the percent acetylene in the effluent is plotted against the volume hourly space velocity. Curves A, B, and C, pertain to runs at actual linear velocities of 5.5, 14.9, and 18.0 meters/sec., respectively. The results in Table I and FIGURE 3 show that the extent of removal of acetylene is a function of the linear velocity and space velocity. At the conditions of operation, that is the given temperatures, pressure, and $C_2H_2$ to $H_2$ to ratio, 1.56% acetylene was effectively removed to .04% at a linear velocity of about 18.0 m./sec. and a volume hourly space velocity of $1.3 \times 10^6$. A projection of the results to higher linear velocities indicates that still higher space velocities can be used for effective acetylene removal. This is shown in Example 2.

Example 2

A set of tests using the same catalyst and a procedure similar to that described above, except that the ethylene stream contained 1.7% acetylene and 2.45% hydrogen ($C_2H_2:H_2=1:1.5$) shows that at a linear velocity of 34.1 m./sec., over 50% of the acetylene was removed from the stream at a volume hourly space velocity of $4.32 \times 10^6$. Analysis of the effluent showed 0.78% $C_2H_2$ and 0.74% $H_2$, indicating that not only was the catalyst effective at this high space velocity, it was also very selective.

Example 3

Ethylene was passed into a unitary ceramic honeycomb type corrugated catalyst similar to that used in Example 1 except that the palladium content was about 1% by weight. The inlet gas contained 3.9% hydrogen and 2.6% acetylene. The bed was optionally in four sections each three inches long. All but three apertures were covered in the support. The inlet temperature was about 179–184° C., and a pressure of about 200 p.s.i.g. was maintained. The results, tabulated in Table II, indicate the effect of linear velocity on acetylene removal at relatively low linear velocities.

TABLE II

| Actual linear velocity (m./sec.) | Space velocity (hrs.$^{-1}$) | Effluent Composition | | Length of catalyst bed (in.) |
|---|---|---|---|---|
| | | $C_2H_2$ (vol. percent) | $H_2$ (vol. percent) | |
| .3 | 100,000 | 1.10 | (.08) | 3 |
| .3 | 25,000 | .53 | 00 | 12 |
| .5 | 200,000 | .99 | .30 | 3 |
| .5 | 50,000 | .53 | 00 | 12 |
| 1.0 | 400,000 | 1.35 | .75 | 3 |
| 1.0 | 100,000 | .53 | 00 | 12 |
| 2.0 | 800,000 | 1.22 | 1.0 | 3 |
| 2.0 | 200,000 | .30 | 00 | 12 |

It is apparent from the data of Examples 1, 2 and 3 that the rate and extent of acetylene removal and the selectivity of the desired hydrogenation reaction improve substantially with increasing linear velocity within the honeycomb catalyst tested. This is further illustrated in FIGURE 2.

FIGURE 2 shows the relationship between the amount of acetylene remaining in the effluent and linear velocity. A honeycomb type catalyst having 11 corrugations/inch was used in the process providing the data for this figure. The process was run at a temperature of 180° C., a volume hourly space velocity of about 600,000 and with 1% palladium on the support. The ethylene input contains 1.7% of acetylene and 2.8% of hydrogen. This curve quite closely represents the values obtained using differing quantities of hydrogen and acetylene and volume hourly space velocities up to about 1,300,000. FIGURE 3 also shows that the extent of acetylene removal at a given linear velocity is essentially independent of the space velocity at volume hourly space velocities less than about $1.3 \times 10^6$.

By virtue of this invention actual linear velocities of .5–50 meters/sec. may be advantageously used to decrease the amount of acetylene in ethylene and to improve the selectivity of the reaction. This combination of desired results, plus the concomitant advantages pertaining to decreased reactor size and pressure drop because of catalyst configuration, provide a substantial advantage over catalyst pellets and similar catalyst supports known in the art.

Example 4

Comparative life tests were run on two unitary ceramic honeycomb type catalysts of this invention and a conventional pelleted catalyst.

In the tests on the unitary ceramic honeycomb type catalysts a stainless steel reactor approximately 3½ ft. long and ⅜" I.D. was used. The length of the catalyst bed was approximately 2½ ft. Contaminated ethylene was fed to the bottom of the reactor at about 180° C. and 200–250 p.s.i.g. In one test unitary ceramic honeycomb type catalyst evaluated had a support with 7 corrugations per inch. In a second test, the unitary ceramic honeycomb type support had 11 corrugations per inch. Each support had about 10% alumina deposited thereon.

A third test was run using a palladium catalyst on ⅛ inch diameter alumina pellets sold commercially for use in removal of acetylene from ethylene. This pelletized support process was performed in a stainless steel pipe reactor having ½" I.D. using ten cubic centimeters of catalyst in a 3½" bed. A temperature of about 180° C. and at a pressure of 200–250 p.s.i.g. was maintained in the reactor.

The test conditions are shown in Table III which shows the number of hours the experiments were run until 0.3% $C_2H_2$ was detected in the effluent. A comparison of the honeycomb type vs. pelleted catalysts indicates about a 15 fold greater life of the honeycomb type catalysts of this invention.

Upon regeneration, the unitary ceramic honeycomb type catalyst having 11 corrugations per inch was run for over 1000 hours. At 1018 hours analysis of the effluent showed 0.09% $C_2H_2$ and 0.04% $H_2$.

TABLE III

| Catalyst structure | Percent Pd | Standard conditions | | | Average ratio $H_2$:$C_2H_2$ | Approx. hours to .3% $C_2H_2$ in effluent |
|---|---|---|---|---|---|---|
| | | Actual linear velocity, meters/sec. | Space velocity, $\times 10^3$ | Percent $C_2H_2$ inlet | | |
| 7 corr. Honeycomb | 0.5 | 4.1 | 100 | 1.5 | 1.8 | 700 |
| 11 corr. Honeycomb | 1.0 | 1.9 | 100 | 2.0 | 1.5 | 550 |
| ⅛" diameter Pellet | .0012 | | 10 | 1.5 | 1.5 | 25–50 |

Example 5

An ethylene stream containing 1.7% acetylene and 2.45 percent hydrogen is contacted with a honeycomb type catalyst, composed of about 0.5% Pd and 8% alumina on a corrugated Alsimag support having 11 corrugations per inch, at a temperature of 180° C., a pressure of 200–250 p.s.i.g., a linear velocity of 19.3 m./sec., and a volume hourly space velocity of $3 \times 10^6$. The effluent is analyzed and shows 0.4% $C_2H_2$ and 0.2% $H_2$.

The effluent from the first reactor is fed with additional $H_2$ (to have a $C_2H_2$ to $H_2$ ratio of 1:2.5) at the same temperature and pressure to a second reactor approximately ¼" diameter x 30" length containing a pelleted catalyst composed of 0.0012% Pd on ⅛" diameter alumina supports. At a volume hourly space velocity of 10,000 the resultant stream contains less than 2 p.p.m. $C_2H_2$.

Example 6

A life test on the pelleted catalyst described in Example 5 was run for 475 hours on an ethylene stream containing 0.27–0.69% acetylene and 0.90–1.05% $H_2$. The results of the test are tabulated in Table IV. A comparison of the results of Table IV with the results shown for the pelleted catalyst in Table III shows that the extent of deactivation of the pelleted catalyst is markedly affected by $C_2H_2$ concentration. Table III shows that when the inlet feed contained 1.5% acetylene and 1.5% $H_2$ the conventional pelleted catalyst was deactivated readily; in approximately 25–50 hours, .3% $C_2H_2$ appeared in the feed. Table IV shows that when using a similar catalyst but with roughly 0.5% $C_2H_2$ and 1.05% $H_2$ in the feed, the catalyst effectively removed the acetylene to less than 2 p.p.m. at 475 hours.

TABLE IV

Pressure: 200–250 p.s.i.g.
Temperature: 150–210° C.
Space velocity 10,000 v./v./hr.
Reactor geometry: ¼ x 30 inches

| Cumulative time (hrs.) | Inlet Composition | | Effluent Acetylene (p.p.m.) | Composition hydrogen (vol. percent) |
|---|---|---|---|---|
| | Acetylene (vol. percent) | Hydrogen (vol. percent) | | |
| 0 | .36 | .90 | <25 | <.05 |
| 211 | .27 | 1,20 | <2 | |
| 307 | .40 | 1,05 | <2 | .40 |
| 331 | .40 | 1,05 | <2 | .45 |
| 355 | .41 | 1,15 | <2 | .5 |
| 379 | .69 | 1,18 | 50 | |
| 400 | .41 | 1,05 | 23 | .5 |
| 475 | .41 | 1,05 | <2 | .65 |

Example 7

A propylene stream containing 1% methyl acetylene and 1.5% hydrogen was fed under a pressure of 100 p.s.i.g. and at a temperature of about 175–180° C. to a catalyst bed containing a unitary ceramic honeycomb catalyst having 11 corrugations per inch and having deposited thereon about 1% Pd and about 10% alumina, based on the total catalyst weight. At a volume hourly space velocity of 340,000 and an actual linear velocity of 17 meters/ec., analysis of the effluent showed 0.9% methyl acetylene and 0.35% $H_2$. At a volume hourly space velocity of 1,360,000 and a linear velocity of 17 meters/sec., analysis showed 0.29% methyl acetylene and 0.35% $H_2$ in the effluent. The test showed that the methyl acetylene impurity in a propylene stream could be reduced to low levels at very high space velocities.

In the examples above, the following cross-sectional areas are used as basis for calculation of space velocity and linear velocity.

7 corr./inch: nominal $3.1 \times 10^{-2}$ cm.$^2$ (estimated actual $1.78 \times 10^{-2}$ cm.$^2$).

11 corr./inch: nominal $1.38 \times 10^{-2}$ cm.$^2$ (estimated actual $1.0 \times 10^{-2}$ cm.$^2$).

The nominal cross-sectional area is obtained by dividing the unit area by the number of holes present. Estimated actual cross-sectional area of the holes excludes the area occupied by the walls. The gas temperature is measured at the inlet of the first reactor. For acetylene and methyl acetylene analysis I.R. or titration is used. A good agreement between these methods is found to exist. The hydrogen level is determined by gas chromatography using a Linde molecular sieve column. The catalyst samples are stored in sealed plastic bags.

Example 8

A first stage reactor and a second stage reactor were constructed in a chamber fabricated from an 8″ diameter stainless steel pipe. The first stage reactor consisted of a 60″ x ½″ stainless steel tube which contained two 30″ sections of a honeycomb type catalyst composed of about 1% Pd and 9½% alumina deposited on a zircon mullite corrugated support having 11 corrugations per inch. Only one hole was exposed. The second stage reactor consisted of two catalyst beds in parallel, each 30″ x ¼″ dia. and containing about 0.015% Pd on ⅛″ $Al_2O_3$ pellets. The heaters were so arranged that both stages were operated at about the same temperature.

An ethylene stream containing acetylene and hydrogen were fed at 150–250 p.s.i.g. and at elevated temperatures to the chamber. The volume hourly space velocity in the first stage was 100,000. Hydrogen was added between the first and second stages and the volume hourly space velocity in the second stage was 14,000. Results are tabulated in Table V.

The results in Table V show that the multistage process was effective for selectively removing about 2% $C_2H_2$ from an ethylene stream at an overall $H_2/C_2H_2$ ratio of 1.8–2.0/1, at a high overall space velocity and with long life. At 454 hours on stream the process was still effective for reducing the $C_2H_2$ level to less than 1 p.p.m.

TABLE V.—ACETYLENE REMOVAL, TWO STAGE

| Running hrs. | First stage | | | | | Second stage | | |
|---|---|---|---|---|---|---|---|---|
| | Inlet | | Outlet | | Addition Percent $H_2$ | | Outlet | |
| | Temp., °C. | Percent $H_2$ | Percent $C_2H_2$ | Percent $H_2$ | Percent $C_2H_2$ | | Temp., °C. | Percent $H_2$ | P.p.m. $C_2H_2$ |
| 184 | 200 | 3.00 | 1.97 | (*) | 0.22 | 1.0 | 215 | 0.03 | 30 |
| 208 | 195 | 3.00 | 2.01 | (*) | 0.28 | 0.7 | 222 | (*) | 3 |
| 232 | 208 | 3.00 | 2.01 | (*) | 0.20 | 1.0 | 218 | 0.05 | <1 |
| 280 | 203 | 2.99 | 1.93 | 0.03 | 0.17 | 1.0 | 216 | 0.07 | <1 |
| 304 | 215 | 3.00 | 1.95 | (*) | 0.21 | 0.9 | 228 | 0.05 | <1 |
| 330 | 230 | 2.99 | 2.02 | (*) | 0.20 | 0.9 | 245 | 0.05 | <1 |
| 358 | 215 | 3.05 | 1.99 | 0.05 | 0.24 | 0.9 | 236 | 0.08 | <1 |
| 382 | 209 | 3.00 | 2.05 | 0.08 | 0.46 | 1.1 | 227 | 0.02 | <1 |
| 406 | 210 | 2.99 | 2.00 | 0.15 | 0.48 | 1.1 | 228 | 0.02 | <1 |
| 430 | 213 | 3.00 | 1.87 | 0.18 | 0.47 | 0.9 | 241 | 0.08 | <1 |
| 454 | 214 | 3.05 | 1.81 | 0.20 | 0.64 | 0.9 | 240 | 0.08 | <1 |

* <30 p.p.m.

As noted previously purification processes similar to those described and shown above can be used for other streams, such as $C_3$ streams containing acetylenes and dienes. For example, a typical $C_3$ product stream from a petroleum cracking process may contain 93.5% $C_3H_6$, 4% $C_3H_8$, 0.5% $C_3H_4$ (methyl acetylene) and 2.0% propadiene. This feed can be treated advantageously in a two-stage process, such as described previously, using a unitary ceramic catalyst in the first stage and a particulate catalyst with low catalytic metal content in the second stage. A suitable catalyst for the first stage is about 1% Pd and 10% alumina deposited on a unitary ceramic honeycomb type catalyst having 11 corrugations per inch. A suitable catalyst for the second stage is 0.015% Pd on ⅛″ activated alumina. In such process the catalysts would have long life and would be effective in reducing the impurities to, for example, no more than 10 p.p.m. methyl acetylene and 50 p.p.m. propadiene.

The preceding examples all use a platinum group metal, i.e. Pd, as the catalytic metal. Other Group VIII metals, e.g. Ni, are also effective for the purification processes of this invention. A suitable Ni catalyst may be prepared by depositing $Ni(NO_3)_2$ on a unitary ceramic block support which has alumina, e.g. about 8% deposited thereon, heating the combined catalyst to 600° C., and reducing the NiO remaining thereon to the metal by treatment with $H_2$. The resultant Ni catalyst, e.g. composed of about 1% Ni and 8% alumina on a unitary ceramic honeycomb type block can be used for butadiene stream purification.

A butadiene stream may typically contain: 45% 1,3-butadiene, 46% butylenes, 8% butanes, 0.4% $C_3$ and $C_4$ acetylenic compounds, and 0.6% other $C_3$ compounds including small amounts of allene. Typical acetylenic compounds present include methyl acetylene, ethyl acetylene and vinyl acetylene. For reduction of the acetylenic content with minimized hydrogenation of monoolefins and butadiene diolefins, passage of the liquefied stream at relatively low temperatures, for example 20° C., and 10 atmospheres pressure, has been described with conventional supported Ni particulate catalysts.

Such selective hydrogenations are improved in accordance with the present invention by contacting the butadiene stream at high space velocity, rapid linear velocity, and relatively low temperature in vapor phase with a Ni containing catalyst supported on ceramic block catalysts, such as described above, in accordance with the present invention. Use of relatively low temperatures and pressures for vapor phase treatment, for example 0° C. and 0.5 atmosphere pressure, and rapid gaseous linear velocity, e.g. 1–10 meters per second, with 10% to 30% by volume of $H_2$ present makes possible selective removal of acetylenes and allene.

Linear velocity of the gaseous impure butadiene stream for removal of the acetylenes is favorably at about 5 meters per second in gaseous flow rate at 0° C. and 0.5 atmosphere pressure. Under these conditions over 80% of the $C_3$ and $C_4$ acetylenic compounds and of the allene present can be removed, with only minor butadiene hydrogenation.

It should be understood that although this invention has been described with reference to particular embodiments thereof, changes and modifications may be made which are within its intended scope, and it should be limited only by the language of the appended claims.

What is claimed is:

1. In a process for the selective removal of more unsaturated hydrocarbons from a less unsaturated hydrocarbon stream by treatment with hydrogen under hydrogenation conditions, including temperatures of 0° to 300° C. and pressures of 5–750 p.s.i.a., in the presence of a catalyst comprising a Group VIII metal, the improvement wherein the catalyst is supported on a unitary ceramic honeycomb type support and wherein the volume hourly space velocity is in the range of 50,000–4,000,000, and the actual linear velocity of the stream is about 0.5–50 meters per second.

2. A process according to claim 1 wherein the unitary ceramic honeycomb type support has 1%–50% by weight activated refractory oxide deposited thereon, based on the weight of the support.

3. A process according to claim 2 wherein the refractory oxide deposit is alumina.

4. A process according to claim 3 wherein the catalyst is palladium or promoted palladium present at about 0.01%–10% by weight of total supported catalyst.

5. A process according to claim 4 wherein the linear velocity of the stream is about 5–30 meters per second.

6. A process according to claim 5 wherein the volume hourly space velocity is about 50,000–1,000,000.

7. A process according to claim 6 wherein the catalyst is palladium present at 0.05%–2% by weight of total supported catalyst.

8. A process according to claim 7 wherein the unitary ceramic honeycomb type catalyst support contains 25–2,500 flow path inlet openings per square inch.

9. A process according to claim 8 wherein the hydrocarbon stream is ethylene contaminated with acetylene.

10. A process according to claim 8 wherein the hydrocarbon stream is propylene contaminated with methyl acetylene.

11. A process according to claim 8 wherein the hydrocarbon stream is propylene contaminated with methyl acetylene and propadiene.

12. A multi-stage process for selectively purifying an ethylene stream containing 1 to 3 volume percent acetylene which comprises, passing the stream together with hydrogen in at least one initial stage in contact with a catalyst comprising palladium supported on a unitary ceramic honeycomb type support having an activated refractory oxide deposited thereon at a volume hourly space velocity of 50,000 to 4,000,000 and an actual linear velocity of about 0.5 to 50 meters per second to obtain a stream containing less than about 0.5% acetylene impurity, and then in a final stage contacting such partially purified stream containing hydrogen with a catalyst comprising palladium on a particulate support at a volume hourly space velocity of 3,000 to 50,000, and recovering a purified ethylene stream containing less than 10 p.p.m. acetylene.

13. A process according to claim 12 wherein the catalyst comprised of palladium on the unitary ceramic honeycomb type support contains 0.01–10% palladium and the particulate catalyst used in the final stage contains 0.5–0.001% Pd.

References Cited

UNITED STATES PATENTS

| | | | |
|---|---|---|---|
| 3,113,980 | 12/1963 | Robinson | 252—466 |
| 3,116,342 | 12/1963 | Robinson et al. | 252—466 |
| 3,155,627 | 11/1964 | Cole et al. | 252—477 |
| 3,255,027 | 6/1966 | Talsma | 252—466 |
| 3,189,563 | 6/1965 | Hauel | 252—460 |
| 3,397,154 | 8/1968 | Talsma | 252—466 |

HERBERT LEVINE, Primary Examiner

U.S. Cl. X.R.

252—477